Figure 1:
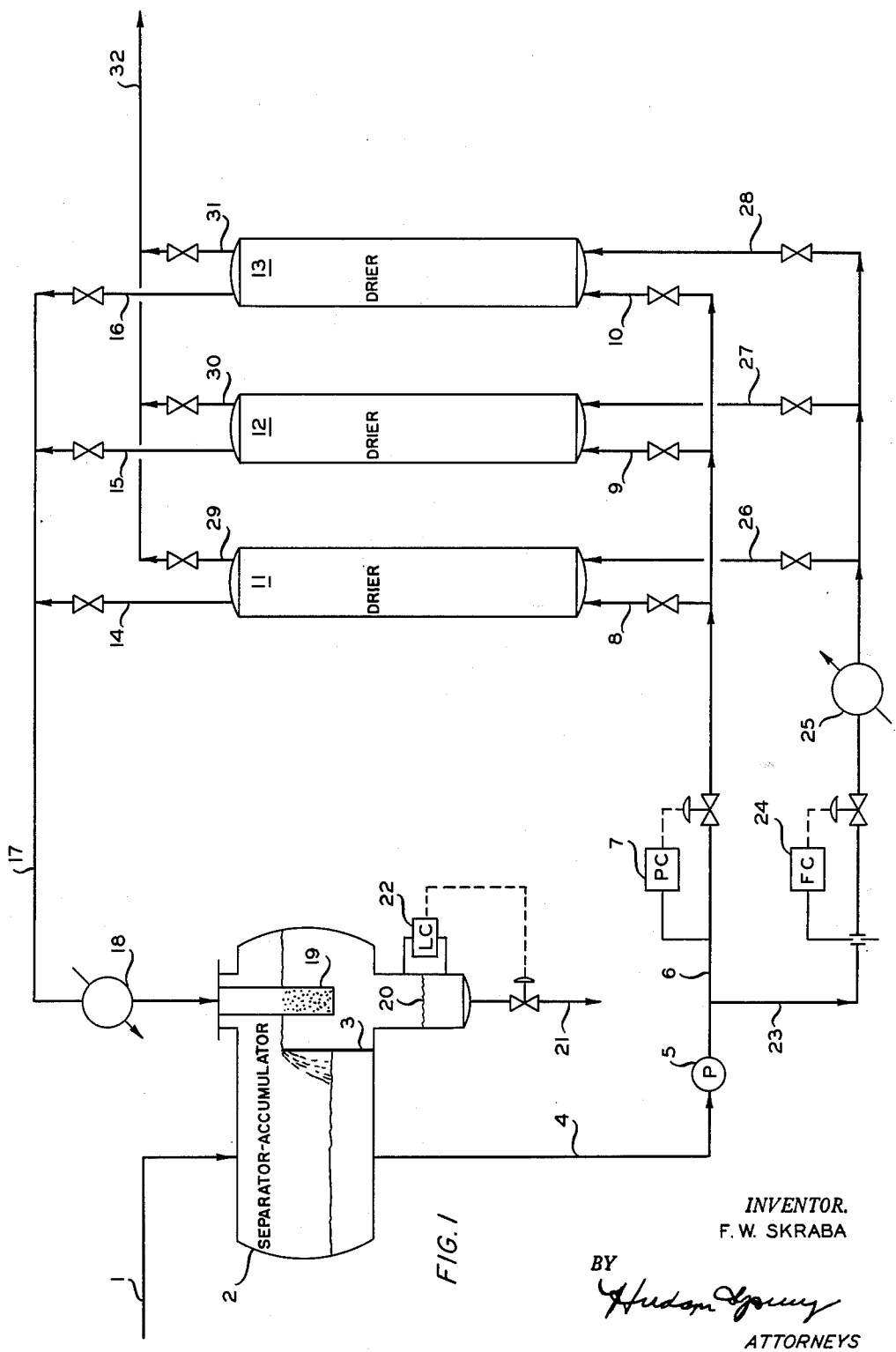

Sept. 7, 1965   F. W. SKRABA   3,205,163
PROCESS FOR DRYING A LIQUID
Filed Dec. 12, 1962   2 Sheets-Sheet 2

INVENTOR.
F. W. SKRABA

United States Patent Office 3,205,163
Patented Sept. 7, 1965

3,205,163
PROCESS FOR DRYING A LIQUID
Frank W. Skraba, Sweeny, Tex., assignor to Phillips
Petroleum Company, a corporation of Delaware
Filed Dec. 12, 1962, Ser. No. 245,353
4 Claims. (Cl. 208—188)

This application is a continuation-in-part of my application Serial Number 37,331, filed June 20, 1960 now abandoned.

This invention relates to a process and apparatus for drying a wet liquid. In one aspect, the invention relates to process and apparatus for drying a wet fluid stream comprising passing the stream to a combined separation-accumulation zone, withdrawing a first stream from the combined zone, drying the first stream in a drying zone, removing the thus-dried first stream as a product of the process, withdrawing a second stream from the combined zone, heating the second stream, passing the thus-heated second stream through the drying zone to effect removal of moisture from the drying zone, introducing the second stream with its accrued moisture to the combined zone, causing coalescence and settling of water in the combined zone, and removing from a lower portion of the combined zone the thus-coalesced and settled water. In another aspect, the invention relates to a process for drying a wet fluid stream which comprises passing the stream to a surge zone, passing the stream through one of a plurality of drying zones, and then withdrawing the stream as a dry product, withdrawing another stream from the surge zone, vaporizing this stream by heating, and passing it through another of the plurality of drying zones, thereby causing removal of moisture accumulated in said another of the plurality of drying zones, cooling the resultant moist stream and then passing it to a relatively quiescent zone wherein water separates from the stream, withdrawing the separated water, and allowing the residue to overflow from the quiescent zone back into the surge zone. In another aspect, this invention relates to a process for drying a wet fluid stream which comprises passing the stream to an accumulation zone, withdrawing a first portion from the accumulation zone, drying the first portion in a drying zone, and removing the dried portion as a product of the process, withdrawing a second portion from the accumulation zone, heating the second portion, passing it through the drying zone to cause removal of moisture from the drying zone, and introducing this wet second portion to a settling zone wherein water separates, withdrawing the separated water and allowing the residue to overflow from the settling zone to the accumulation zone. In still another aspect, this invention relates to apparatus for treating a wet fluid stream which comprises an accumulation vessel, partition means extending through the vessel and adapted to divide the vessel into a first separator volume and a second surge volume, the partition means being adapted to allow flow thereover between the first and second volumes, a fluid inlet means in communication with the second volume, first and second drying means, a first conduit means communicating between a lower portion of the second volume and the first drying means, fluid withdrawal means connected to the first drying means, a heating means, a second conduit means communicating between a lower portion of the second volume and the heating means and between the heating means and the second drying means, a conduit means communicating between the second drying means and the first volume, and liquid withdrawal means communicating with tht lower portion of the first volume. In another aspect yet, this invention relates, in a process for the removal of water from the feedstream of an alkylation process wherein an accumulation zone is required upstream of the water removal zone and wherein an accumulation zone is also required for receiving effluent from the regeneration of the water removal zone, to the improvement which comprises passing the wet feedstream to an accumulation zone, withdrawing a first portion of the wet feedstream from the accumulation zone, heating the first portion to cause substantial vaporzation thereof, passing the first portion then through one of the plurality of drying zones to cause removal of moisture therefrom to a cooling zone to cause substantial condensation thereof, withdrawing the first portion from the cooling zone and introducing the first portion into a relatively quiescent zone wherein water removed from the cooling zone is allowed to separate from the first portion, withdrawing the separated water from the process as a product, and allowing the residue of the cooled portion to overflow from the quiescent zone to the accumulation zone. In yet another aspect, this invention relates to a process for drying a wet liquid stream wherein the stream is passed to a surge zone, a portion of the wet liquid stream is withdrawn, dried, and utilized as product, and another portion of the wet liquid stream is withdrawn, heated, used to sweep accumulated moisture from a drying zone, cooled to condensation, and phase separated with removal of water as one product, the residue of the stream being allowed to overflow back to the accumulation zone. In a further aspect, the invention relates to such a process wherein the water is withdrawn from a separation zone in response to the interface level therein.

In various industrial processes, it is often desirable or necessary to dry a process stream before its utilization. Further, surge accumulation vessels in such a stream are often necessary. It has been proposed in the past to utilize heated wet feed as fluid for regenerating the spent drying material in such processes. Provision for accumulation of such regeneration fluid is also often necessary.

It is an object of this invention to provide an improved process for drying fluids. It is a further object to provide an apparatus for such a process. It is another object of this invention to provide a process for drying liquids wherein a unitary surge zone serves the dual function of dryer feed surge and of spent dryer regeneration liquid accumulation. It is still another object of this invention to provide a process and/or an apparatus for liquid drying wherein a plurality of drying zones are cyclically being operated so as to first dry the liquid stream and, second, undergo regeneration and wherein a unitary zone serves the functions of dryer feed surge and dryer regeneration fluid accumulation and phase separation.

Other aspects, objects and the several advantages of the invention are apparent from a study of the disclosure, the drawing, and the appended claims.

According to this invention, there are provided a method and apparatus for its execution which comprises, broadly, supplying a wet liquid to a combined separation-accumulation zone, withdrawing two streams from said combined zone, drying one of the streams in one of a plurality of drying zones and withdrawing the stream as dried product, heating the other stream, utilizing the heated stream to sweep moisture from another of the drying zones, condensing and phase separating the resultant wet stream, and withdrawing the water phase as another product of the process, the remainder of the stream being caused to coalesce and separate into an aqueous and a non-aqueous phase. Thus, according to the invention, one vessel serves the dual purpose of a feed surge and a regeneration fluid accumulator. Only one pump need be used to supply both wet feed and regeneration fluid to the drying zones. Combining these two accumulation zones also results in the elimination of various instrumentation in the process.

Figure 2:
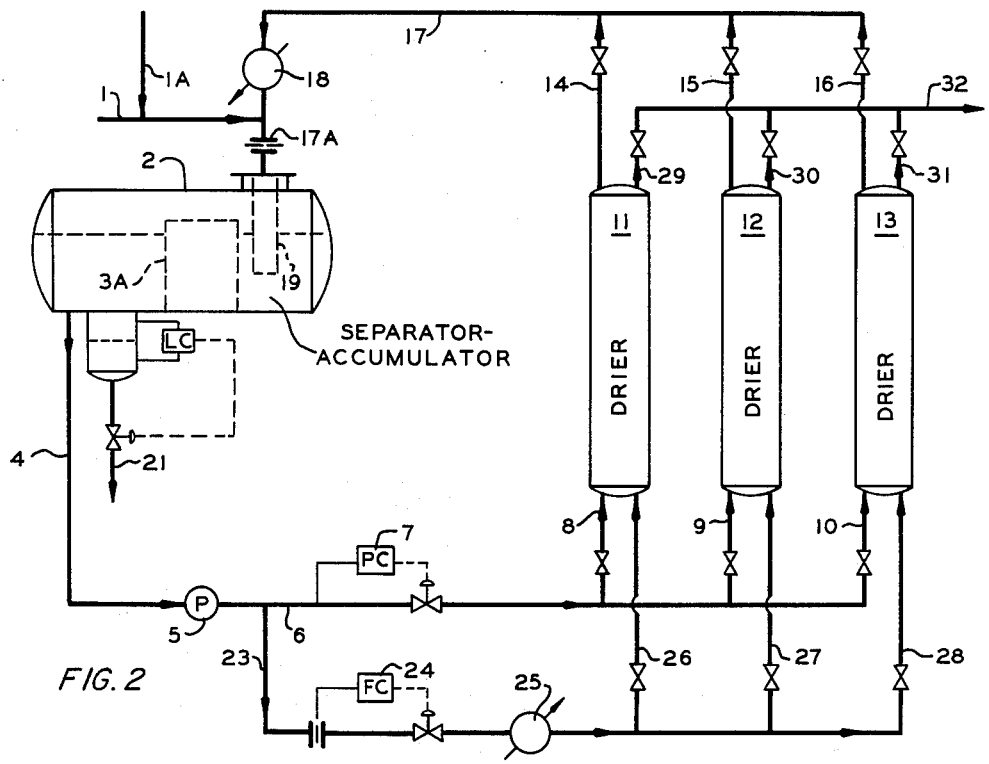
Figure 2A:
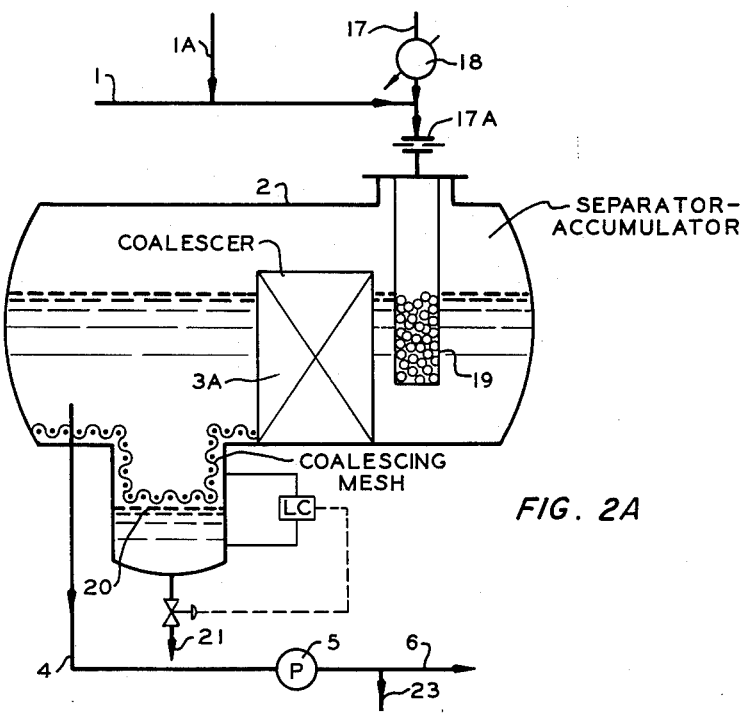

In the drawing, FIGURES 1 and 2 are diagrammatic views of alternate apparatus for carrying out the drying process of the invention. FIGURE 2A is a more detailed view of the separator-accumulator of FIGURE 2.

Referring now to the drawing, and to FIGURE 1 in particular, fresh wet feed is introduced through conduit 1 to accumulator vessel 2. There is provided in vessel 2 a weir or dam 3. Wet feed is withdrawn by conduit 4 and pump 5 through conduit 6 and its associated pressure controller 7. The liquid then flows through conduits 8 and 9 and their associated valves to dryers 11 and 12. These dryers contain bauxite or other suitable desiccant. The liquid is then withdrawn through conduits 29 and 30 and their associated valves to conduit 32, from whence it can be used as dried product. Additional liquid from conduit 4 and pump 5 passes by conduit 23 and its associated flow controller 24 to heater 25, wherein it is substantially completely vaporized. The resultant vapors are passed by conduit 28 to dryer 13, which is similar to dryers 11 and 12. The vapors sweep accumulated water from dryer 13 and the resulting wet vapor stream is passed by conduit 16 and its associated valve through line 17 to cooler 18, wherein the stream is condensed. The resulting wet liquid stream is introduced by sparger 19 to vessel 2 on the opposite side of the weir 3 from that previously described. In this portion of vessel 2, the liquid phase separates. The lower aqueous phase, shown below line 20, is withdrawn through conduit 21 in response to liquid level controller 22 and its associated valve. The residue of this wet stream is allowed to overflow weir 3 back into the accumulation portion of vessel 2.

Referring now to FIGURE 2 and FIGURE 2A, in which like items are numbered to correspond to FIGURE 1, it is seen that fresh wet feed in conduit 1 and wet spent regeneration liquid from conduit 17 and cooler 18 are both introduced into vessel 2 by way of sparger 19. An orifice or other suitable mixing means 17A can be disposed in the inlet conduit as shown. The resulting mixed wet stream issuing from sparger 19 passes through a coalescer 3A, which can be, for example, a mesh pack as known in the art. Coalescer 3A effects a combining and condensing of water particles in the liquid such that, by the time the stream has passed from the right to the left side of the coalescer in the drawing, the water will drop to a lower portion of the vessel 2 and be collected in the leg as shown by level 20. In this embodiment, it is noted that pump suction conduit 4 is preferably raised some distance above the floor of vessel 2 so as to further prevent any water being withdrawn by way of conduit 4. Further, conduit 1A is provided to admit a treating agent, when desired, which is homogeneously mixed by means 17A. Such treating agent can, for example, comprise a feed wash such as wash water so as to remove traces of caustic or other treating agents as required by the specific process. The embodiment of the invention illustrated in FIGURE 2 has the additional advantages of providing for removal of acid, treating solution, caustic, inhibitor, solids, corrosive matter, corrosion products, etc. in the entering feed prior to contact with the dryer downstream, which protects against damage or contamination of the dryer material. Further, when the dryer material is incapable of removing these contaminants, such materials entering equipment downstream of the dryer could cause even greater damage such as catalyst poisoning or equipment fouling if not removed as just described.

It is seen in the preceding description of the drawing that dryers 11 and 12 have been used to dry the process stream, resulting in the final dried product being withdrawn through conduit 32. Dryer 13 was, in the meantime, being regenerated by passing vaporized feed therethrough, the resulting wet stream being condensed and phase separated, and the water phase being withdrawn. The remainder of the stream was allowed to return to the wet feed accumulation zone. This operation is cyclic in nature and it is understood that one or more of the dryers 11, 12, and 13 may be on drying duty while the others are being regenerated. This is accomplished by suitable manipulation of the valves associated with conduits 8, 9, 10, 14, 15, 16, 26, 27, 28, 29, 30 and 31. Further, while the process has been described utilizing three dryers, it is understood that in some instances only two dryers may be required, one being on drying duty while the other is being regenerated. In the example, the rate of liquid being dried is controlled by pressure controller 7, while the rate of liquid used in regeneration of the drying zones is controlled by flow controller 24. It is understood that other suitable modes of control may be utilized. Apparatus suitable for the process as illustrated are disclosed in the Foxboro Company's Bulletin 5A–10A, November, 1955, page 11, designated Model 40 Controllers, for pressure, level and flow controllers.

As a further illustration, the invention is now described in conjunction with drying the feedstock to an HF alkylation unit. This feedstream comprises, on a dry basis, about 20 volume percent propylene, 45 volume percent isobutane, 25 volume percent butylene, and 10 volume percent normal butane. Below are tabulated the hydrocarbon and water content of various streams at critical points in the process.

*Table I*

| Line No. | Hydrocarbon, b./hr. | Water, #/hr. |
| --- | --- | --- |
| 1 | 1,000 | 100 |
| 4 | 1,250 | 125 |
| 8 and 9 | 1,000 | 100 |
| 28 | 250 | 25 |
| 17 | 250 | 121 |
| 21 | trace | 96 |
| 32 | 1,000 | 4 |

In this process, accumulator 2 is operated at 100° F. and 200 p.s.i.g. (liquid phase). Dryers 11, 12 and 13 when operated on the drying cycle are at about 100° F. and 220 p.s.i.g. When on regeneration, they are operated at 400° F. and 210 p.s.i.g. The dryers are operated on a 24 hour cycle, each dryer being on drying duty 16 hours and on regeneration 8 hours.

Reasonable variation and modification are possible within the scope of the foregoing disclosure, the drawing, and the appended claims to the invention, the essence of which is the provision of a process and apparatus for drying a liquid stream wherein one accumulation vessel serves two functions, that of providing surge for process feed and that of providing accumulation and phase separation for dryer regeneration fluid.

I claim:

1. A process for removing water from a liquid hydrocarbon stream containing water which comprises passing said liquid stream to a combined separation-accumulation zone, causing liquid in said combined zone to pass through a coalescing zone in said combined zone so as to form a lower aqueous phase and an upper hydrocarbon phase in said combined zone, withdrawing a first stream from said upper hydrocarbon phase, passing said first stream through one of a plurality of drying zones wherein a substantial portion of the water contained in said first stream is removed from said first stream and accumulated in said one of a plurality of drying zones, withdrawing the resulting dry liquid hydrocarbon stream from said one of said drying zones as product, withdrawing a second stream from said upper hydrocarbon phase, heating said second stream to such a temperature that it is substantially completely vaporized, passing the resulting hot vapor stream through a second of said plurality of drying zones whereby water accumulated therein is removed by said vapor stream, cooling the resulting wet vapor stream to such a temperature that it is substantially completely liquefied, passing the thus-liquefied stream to said combined zone so as to pass through said coalescing zone, and withdrawing from said lower aqueous phase a stream comprising water.

2. The process of claim 1 wherein there is admixed with said liquid stream, prior to its introduction into said combined zone, a treating agent.

3. A process for removing water from a liquid hydrocarbon stream containing water which comprises passing said liquid stream to an upstream portion of a combined separation-accumulation zone, causing liquid in said upstream portion to pass to a downstream portion of said zone, while passing said liquid from said upstream portion to said downstream portion of said zone passing said liquid through a coalescing section so as to form a lower aqueous phase and an upper hydrocarbon phase in said zone, withdrawing a first stream from said upper hydrocarbon phase, passing said first stream through one of a plurality of drying zones wherein a substantially proportion of the water contained in said first stream is removed from said first stream and accumulated in said one of a plurality of drying zones, withdrawing a resulting dry liquid hydrocarbon stream from said one of said drying zones as product, passing a second stream from said upper hydrocarbon phase through a heating zone, in said heating zone heating said second stream to a temperature such that it is substantially completely vaporized, passing the resulting hot vapor stream through another of said plurality of drying zones whereby water accumulated in said another drying zone is removed therefrom into said vapor stream, removing said vapor stream from said another drying zone, cooling said withdrawn vapor stream to a temperature such that it is substantially liquefied, passing the thus cooled stream to the upstream portion of said combined zone, and withdrawing from said lower aqueous phase a stream comprising water.

4. A process for drying a wet fluid stream which comprises
passing said stream to a combined separation-accumulation zone,
causing liquid in said combined zone to pass through a coalescing zone in said combined zone so as to form an upper organic phase and lower aqueous phase in said combined zone,
withdrawing a first stream from the upper phase,
drying said first stream in a drying zone,
removing the thus dried first stream as a product,
withdrawing a second stream from said upper phase of said combined zone,
heating said second stream to such a temperature that it is substantially completely vaporized,
passing the resulting hot vapor stream through said drying zone to effect removal of water from said drying zone,
condensing the resulting wet vapor stream,
passing the thus liquefied stream to said combined zone so as to pass through said coalescing zone, and
withdrawing from said lower aqueous phase a stream comprising water.

References Cited by the Examiner

UNITED STATES PATENTS

| | | | |
|---|---|---|---|
| 2,323,524 | 7/43 | Downs | 208—188 |
| 2,368,497 | 1/45 | Shipley et al. | 208—187 |
| 2,949,408 | 8/60 | Bauer et al. | 208—188 |
| 3,016,345 | 1/62 | Price | 208—187 |
| 3,035,060 | 5/62 | Binning et al. | 208—187 |

ALPHONSO D. SULLIVAN, *Primary Examiner.*